Aug. 15, 1950  A. N. BENSON  2,518,445
PROCESS AND APPARATUS FOR CATCHING MACHINE GUN BULLETS
Filed June 23, 1947  2 Sheets-Sheet 1
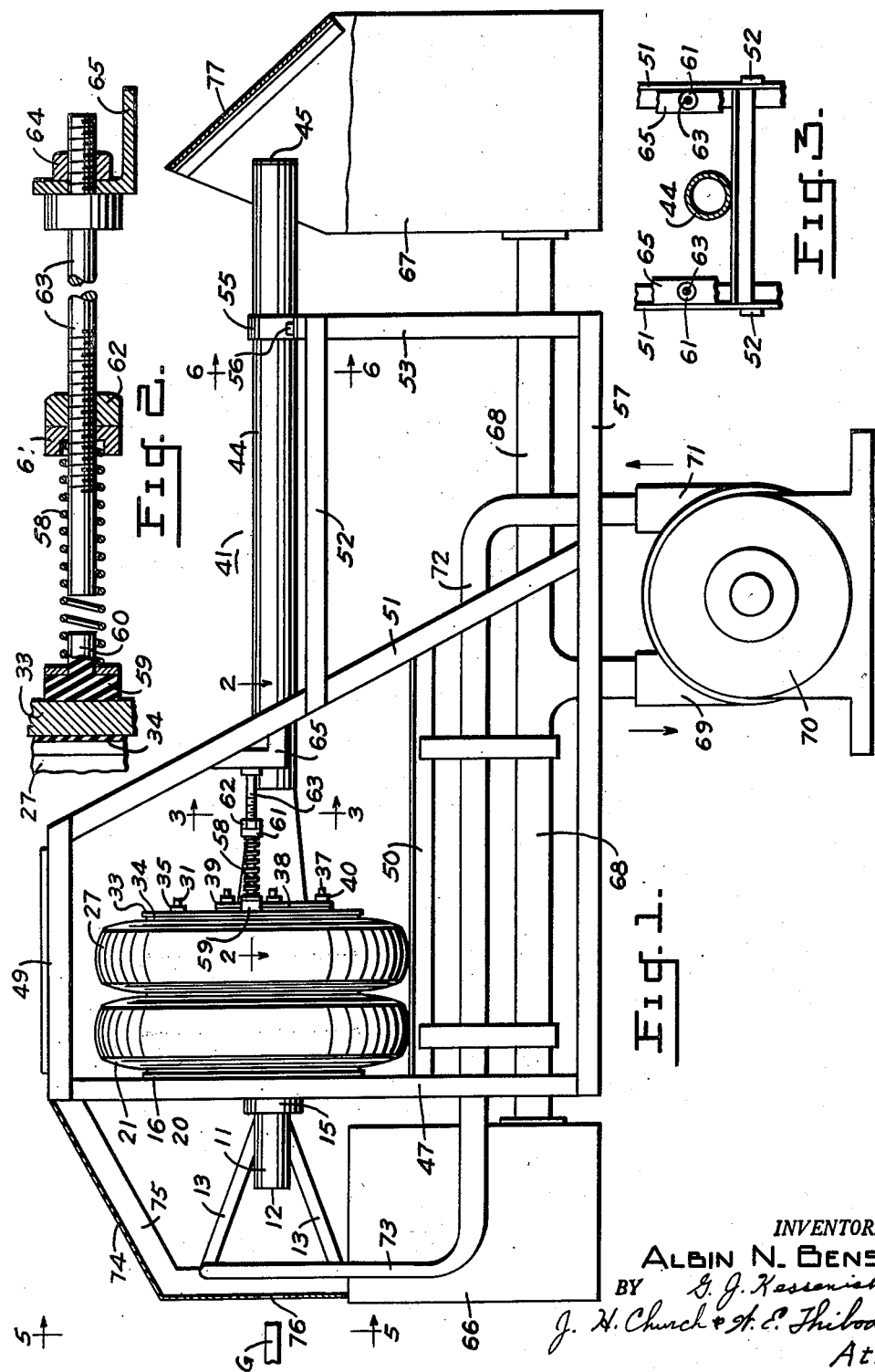
INVENTOR.
ALBIN N. BENSON.

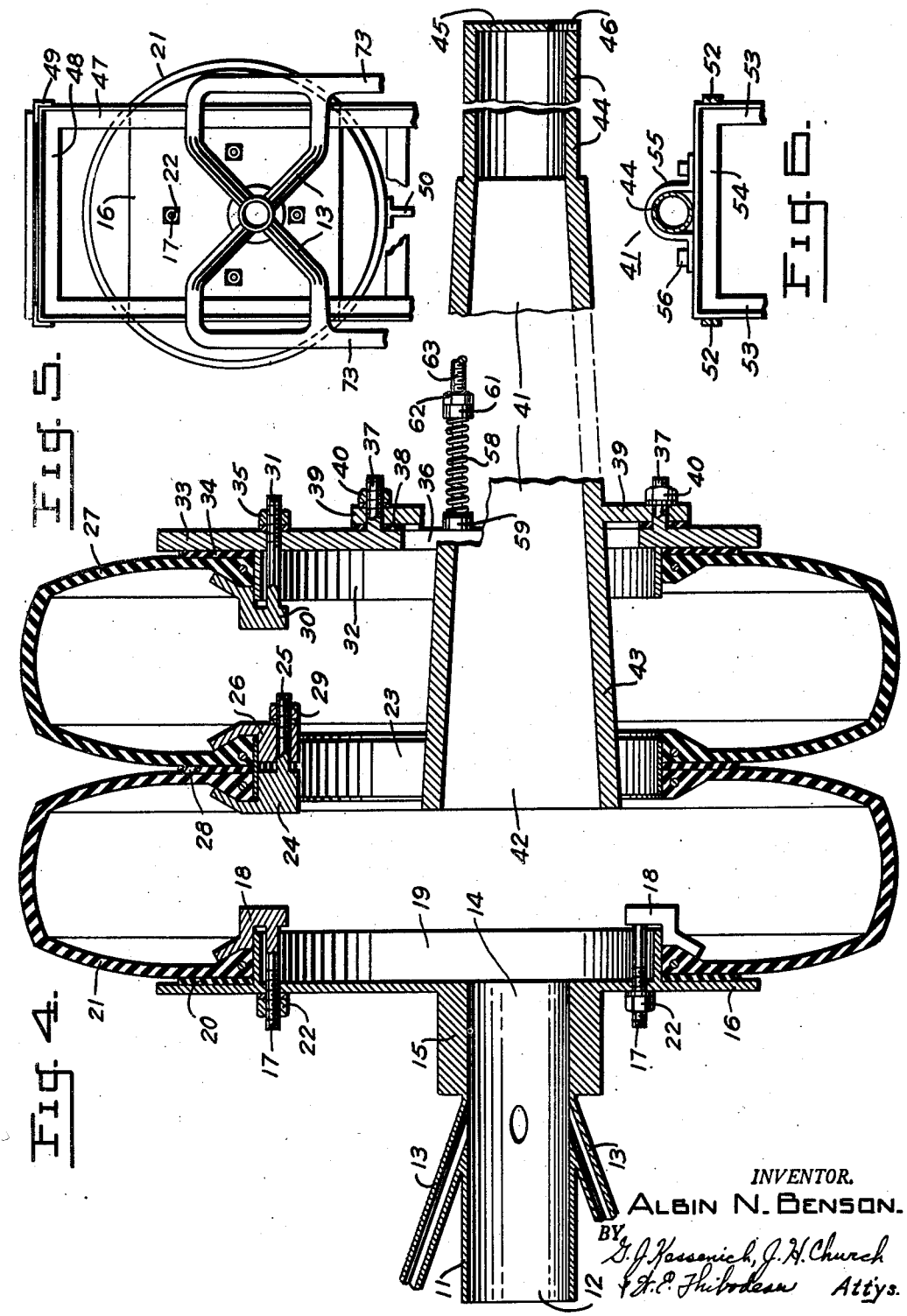

Patented Aug. 15, 1950

2,518,445

UNITED STATES PATENT OFFICE 2,518,445

PROCESS AND APPARATUS FOR CATCHING MACHINE GUN BULLETS

Albin Nils Benson, Philadelphia, Pa.

Application June 23, 1947, Serial No. 756,535

9 Claims. (Cl. 73—167)

(Granted under the act of March 3, 1883, as amended April 30, 1928; 370 O. G. 757)

The invention described in the following specification and claims may be manufactured and used by or for the Government for governmental purposes without the payment to me of any royalty thereon.

It is an object of this invention to provide an apparatus for and a process of catching or stopping machine gun bullets of all types including armor piercing, incendiary and tracing, which apparatus is for and which process comprises: firing a burst or series of machine gun bullets into a flowing stream of water; absorbing, by means of an elastic, resilient, renitent structure, the initial shock wave resulting from the impact of each bullet against the flowing stream; absorbing the kinetic energy of each bullet by transforming it into kinetic energy of flowing water; and allowing the bullets to settle by gravity from the water.

It is a further object of this invention to provide a catcher or stop for machine gun bullets, which catcher or stop comprises: an inlet tube having an open end; nozzles mounted at an angle to the longitudinal axis of the inlet tube and connected so that each nozzle supplies a jet of water to the inlet tube, which jets maintain a head of water in a shock absorption tube consisting of a cylindrical continuation of the inlet tube having an increased cross section and being formed of resilient, flexible, elastic material; an energy absorption tube forming a continuation of the shock absorption tube through which the water flows and has increased kinetic energy imparted to it as a result of the pressure built up by the bullets in the resilient section; and an outlet basin into which the water pours from the energy absorption section and in which each bullet settles out of the standing water.

In the drawings:

Fig. 1 is a side elevation showing the device schematically or diagrammatically.

Fig. 2 is a vertical longitudinal cross section on an enlarged scale on line 2—2 of Fig. 1.

Fig. 3 is a vertical transverse cross section on the same scale as Fig. 2 on line 3—3 of Fig. 1.

Fig. 4 is a vertical longitudinal cross section on an enlarged scale with parts broken away transversely to shorten the longitudinal length of the view.

Fig. 5 is an end elevation on line 5—5 of Fig. 1, and

Fig. 6 is a vertical transverse cross section on line 6—6 of Fig. 1.

One selected embodiment of the apparatus of this invention is as follows: the muzzle of the machine gun undergoing test is represented at G in the left-hand side of Fig. 1. This machine gun may be as large caliber .50 and, when firing at a high cyclic rate, the energy contained in the bullets so fired is equal to 450 H. P.

Referring to Fig. 4, a trapping or catching device for stopping these bullets and absorbing the energy therein comprises a head or inlet end consisting of an inlet tube 11 having an open inlet end 12 and a plurality of nozzles 13 arranged about its surface so that a jet of water or other fluid issuing from each of said nozzles is delivered at an angle to the axis of the inlet tube. The inlet tube 11 has an open outlet end 14, the surrounding wall being reinforced as indicated at 15. A plate 16 forms a lateral extension of the inlet tube 11 and is attached thereto as by welding. Plate 16 has a plurality of perforations through it arranged in a ring. Through each of these perforations passes a bolt 17 having at its inner end a clamp 18. A short cylindrical section is welded or otherwise fastened to plate 16 so that it projects inwardly therefrom. A flat ring 20 of rubber or like material forms a gasket between the inner face of plate 16 and a portion of the side wall of a heavy-duty truck tire 21, which is mounted, at one side, on the cylinder 19 and held in position thereon by bolts 17 and clamps 18. Nuts 22 are provided on the bolts 17 for this purpose. The opposite inside edge of truck tire 21 contacts a second short cylindrical section 23 and is secured thereto by means of a series of clamps 24 which form the heads or ends of a series of bolts 25. On each of bolts 25 is slidably mounted a movable clamp 26 adapted to engage a portion of the inner side of a second heavy-duty truck tire 27 and to clamp tire 27 against tire 21, the junction between them being sealed by a second flat ring 28 serving as a gasket. Nuts 29 press clamps 24 and 26 towards each other so as to grasp portions of tires 21 and 27 between them. The rearward edge of tire 27 is supported and sealed in a similar manner. A series of clamps 30, forming the heads of bolts 31, are stressed against portions of the inner side wall of tire 27 and hold it upon the outer edge of a third cylinder 32 which is welded or otherwise secured to a flat plate 33 having a series of perforations in it through which the bolts 31 pass. A third flat ring 34, serving as a gasket, is interposed between the outer face of tire 27 and the opposite face of plate 33. A number of nuts 35 are each mounted on one of the bolts 31 and permit pressure to be applied to clamp 30.

The plate 33 has a perforation 36 through it and, surrounding this perforation, a series of projecting studs 37. Studs 37 pass through perforations arranged in a ring adjacent the edge of a gasket 38 and through perforations arranged in a ring adjacent the edge of plate 39. Each of the studs 37 carries a nut 40 on it which serves to tighten the plate 39 and the gasket 38 against plate 33 and thereby form a tightly sealed wall.

An outlet tube 41 of square cross section is mounted on plate 39 by welding or other means. Outlet tube 41 has an open inlet end 42 opposite the outlet end 14 of inlet tube 11. The walls 43 of outlet tube 41 adjacent the inlet end 42 slope in the form of a frustum of a hollow pyramid having its larger base or flat surface forming the inlet end 42. The walls 43 are approximately 1 inch thick and are made of homogeneous hardened armor plate. These walls 43 continue for a considerable distance and merge into a cylindrical wall 44 which continues to the outlet end of the outlet tube 41, which outlet end is closed at its upper part by wall 45 and is open at its lower part, as shown at 46.

Referring to Fig. 1, it will be seen that the parts already referred to are mounted in a frame consisting of vertical brackets 47 connected at their upper ends by a top 48 (see Fig. 5). From the junctions of brackets 47 and top 48 project top sides 49. Parallel and beneath the top sides 49 projects a lower support 50. The ends of these sides 49 are connected to diagonal braces 51 from which project horizontal forward sides 52 connected at their ends to front supports 53 which are joined together by a front top 54 (see Fig. 6) on which the cylindrical portion 44 of tube 41 is mounted slidably by means of an inverted U-shaped guide 55 held in position by stud bolts 56. Bottom sides 57 connect the lower ends of brackets 47, of diagonal braces 51, and of front supports 53.

Figs. 1, 2 and 3 each show one of a pair of duplicate springs 58, a description of one of which will suffice since they are alike. Springs 58 are disposed in the same horizontal plane on opposite sides of a vertical plane passing through the axis of outlet tube 41 and yieldingly stress plate 33. Fig. 2 shows tire 27, gasket 34 and plate 33 against which presses a plug 59, of rubber or the like, having a portion 60 of reduced diameter which enters within the end of the coils of spring 58. The opposite end of spring 58 is located within the projecting flange of a nut 61 which is positioned by a lock nut 62 on a screw threaded rod 63 whose opposite end is secured by a nut 64 to an angle iron 65 fastened at its ends to the diagonal brace 51.

A supply of water is provided by means of a front reservoir 66 and a rear reservoir 67 which are connected by inlet pipe 68 to the inlet 69 of a pump 70 driven by a suitable motor (not shown). The outlet 71 from pump 70 connects with an outlet pipe 72 which branches and connects with headers 73 which in turn connect with the nozzles 13, as shown in Figs. 1 and 5.

A splash plate 74 having depending flanges 75 and a front perforation 76 is located on top of front reservoir 66. A rear splash plate 77 is similarly secured on top of rear reservoir 67 opposite the outlet 46 in the end of outlet tube 41.

The operation of the bullet stop or catcher of this invention is as follows. A suitable supply of water or other fluid, such as brine or low freezing point mixture, is provided in reservoirs 66 and 67. Pump 70 is started so that the water is circulated from the reservoirs 66 and 67 through inlet pipe 68, pump 70, outlet pipe 72, headers 73, and nozzles 13 from whence it issues with sufficient velocity to maintain a head of water in the shock absorption section. The quantity, flow and pressure of the water are sufficient so that the water substantially fills the interior of the tires 21 and 27. Some of the water escapes through the inlet end 12 while the remainder of the water escapes through the outlet 46. This water, of course, falls into the reservoirs 66 and 67 respectively. With the apparatus in this condition the machine gun G is then brought so that its axis is aligned with the axes of front perforation 76, inlet tube 11, and outlet tube 41. A burst or rapid succession of bullets is then fired in series into the standing body of water in the interior of the tires 21 and 27. Each bullet leaves the muzzle of machine gun G with an energy of about 1200 foot pounds. When a burst of such bullets is fired at high speed the energy delivered to the water equals 450 H. P. This energy is transformed into kinetic energy of the water. Each bullet as it strikes the water sends out a sharp shock wave. These shock waves are absorbed by the resiliency of the heavy duty truck tires 21 and 27 and flexion of the springs 58. These bullets tend to build up pressure in the interior of the tires 21 and 27 and increase the velocity of the flow of water through the outlet tube 41. The length of the outlet tube 41 is sufficient so that the speed of the bullets and the speed of the water have substantially equalized before the outlet end of the outlet tube 41 is reached. The bullets therfore drop through the outlet 46 into the rear reservoir 67 whence they settle out of the water and can readily be removed after a test or series of tests has been run.

Summary

It will be evident from the foregoing that this invention provides a process of and apparatus for testing heavy caliber machine guns by firing bullets therefrom at their normal high cyclic rates of fire. These bullets are stopped or trapped in a minimum space and in good condition by the use of water contained in a tube, a portion of whose walls are of a material which is sufficiently elastic, flexible and renitent to absorb the shock waves caused by the impact of each bullet in succession without damage to the apparatus or its surroundings.

I claim:

1. A machine-gun-bullet-stopping process including, forming a bank and flowing stream of water by squirting a number of jets of water about a common axis, firing a succession of machine gun bullets into said bank and stream in the direction of the water flow, resisting with a yielding self-restoring pressure the expansion of said bank and stream due to the impact-shock of each of said bullets thereby absorbing said impact-shock, accelerating the flow of said stream and decelerating the speed of each of said bullets by causing said bullets to travel along said stream in the direction of its flow until the speed of each of said bullets and of said stream are substantially equal, and collecting said stream in a reservoir in which gravity causes each of the bullets to descend to the lower part.

2. A process of absorbing the power of a series of machine gun bullets fired in a burst, which process includes, maintaining a bank of liquid in a container, forming a run of liquid flowing from said container catching said machine gun bullets in the liquid bank and run, speeding the flow of said run and reducing the speed of each of said bullets by the co-travel of said run and said bullets in the direction of flow of said run, and thereafter discharging said run and the bullets contained therein from the container.

3. A stop for a series of machine gun bullets including, a tubular inlet section, a plurality of inlet nozzles each having its axis arranged at an angle to the axis of said inlet section so that jets of liquid issuing from said nozzles mix together to form a stream of liquid, a tubular shock-absorption section of increased cross sectional diameter forming the outlet from said inlet section and receiving said stream therein, at least a portion of the walls of said shock-absorption section being formed of flexible elastic renitent material suitable for absorbing from said stream the impact-shock of each of said bullets, an elongated tubular energy-absorption section forming the outlet from said shock-absorption section and receiving said stream and the bullets therein in such a way as to cause said bullets and said stream to travel together through said energy-absorption section thereby decreasing the speed of said bullets and increasing the speed of said stream, and an outlet reservoir communicating with said energy-absorption section and receiving said stream and said bullets therein in such a way that the bullets separate out of said stream.

4. A tubular elongated stop for machine gun bullets including, a plurality of nozzles protruding into the inlet end of said stop at an angle to its axis so that jets of water issue from said nozzles with sufficient velocity to maintain a bank or head of water, a band of flexible resilient elastic renitent material forming a wall of said stop intermediate its inlet and outlet, said wall serving to absorb the shock wave caused by the impact of each of said bullets on said stream of water, an outlet section extending from said bank for a considerable distance to an outlet, this distance being sufficient for the speed of each of said bullets and the speed of the surrounding water to equalize during the co-passage through said outlet section, and a reservoir into which the stream and the bullets in it flow from said outlet-section and in which the bullets separate by gravity from said stream.

5. A machine for catching a series of machine gun bullets fired in quick succession in a burst, said machine including, a tube having a hollow end forming an inlet for bullets, a plurality of nozzles projecting into said tube at an angle to its axis so that jets of water issue from said nozzles with sufficient velocity to maintain a bank or head of water, a rubber tire of greater diameter than said tube connected to the outlet from said tube so that said stream flows into the interior of the tire, said tire being sufficiently renitent to absorb the shock caused by the impact of each of said bullets in succession upon the stream, a frusto-conical outlet tube of homogeneous armor plate having its larger inlet end located within said tire and having its walls sealed to said tire so that said stream and the bullets therein travel through said outlet tube for a sufficient distance to allow the speed of each of said bullets to reduce greatly and the speed of said stream to increase, and a hollow vessel communicating with the outlet end of said outlet tube and receiving said stream and said bullets and in which said bullets fall to the lower part and separate themselves from said stream.

6. A device for stopping machine gun bullets fired in rapid succession including, a pump arranged to circulate a flow of liquid, an inlet tube having an open end forming an inlet for bullets and having a plurality of orifices arranged peripherally around and on an angle to its axis and connected to said pump so that jets of liquid issue from said orifices with sufficient velocity to maintain a bank or head of liquid, a ring-shaped intermediate section sealed to the outlet end of said inlet tube so as to receive the flow of liquid and bullets in the interior of the ring-shaped section, said ring-shaped section being formed of springy material resistant to shock and adapted to absorb from said liquid any shocks which the impact of the bullets imparts to said liquid, and an outlet tube having an enlarged inlet and sealed to and communicating with said ring-shaped section so as to receive said liquid from said ring-shaped section and to conduct said liquid for a sufficient distance to allow the resistance of said liquid to retard the speed of said bullets and thereby absorb the kinetic energy of said bullets and to conduct said liquid and said bullets to an outlet, and a settling basin communicating with the outlet from said outlet tube to receive said liquid and said bullets in said settling basin, said bullets falling by gravity into the lower portion of said settling basin so as to be readily separated from said liquid.

7. In a tubular elongated device for catching or stopping machine gun bullets, a bullet inlet section, a bullet outlet section, a shock absorption section having a relatively yieldable wall intermediate the inlet and outlet sections, a liquid flowing into said inlet section through said shock absorption section and out through said outlet section, and a receptacle for receiving said liquid and bullets.

8. The method of decelerating a projectile which comprises providing an axial chamber having an inlet end and an outlet end both open to the atmosphere and intermediate said chamber ends a much enlarged resilient and renitent section, introducing liquid into said chamber adjacent said inlet end at an angle to the chamber's axis in such manner as to produce a head of the liquid which substantially fills the chamber's intermediate enlarged section and continually flows out through said chamber outlet end, projecting a projectile to be trapped into the chamber inlet end and towards the outlet end at an initial velocity greatly exceeding that of the liquid which flows into the chamber's enlarged section and out through the chamber outlet end, and absorbing at least a major portion of the kinetic energy of said projectile in said liquid, whereby the projectile emerges from the chamber outlet end at a speed considerably less than its initial velocity.

9. The method of decelerating a projectile which comprises providing an axial chamber a portion of which is of yieldable but self-restoring construction, substantially filling said chamber with a continuous stream of liquid flowing therethrough, projecting a projectile into said chamber in the direction of said stream flow at an initial velocity greatly exceeding that of said stream, and absorbing the initial shock wave caused by the impact of the projectile in said flowing stream, whereby to decelerate the projectile to a velocity approaching that of the stream.

ALBIN NILS BENSON.

REFERENCES CITED

The following references are of record in the file of this patent:

UNITED STATES PATENTS

| Number | Name | Date |
|---|---|---|
| 2,356,992 | Gilson | Aug. 29, 1944 |
| 2,407,276 | Hendel et al. | Sept. 10, 1946 |